US011751225B2

(12) United States Patent
Zhou et al.

(10) Patent No.: US 11,751,225 B2
(45) Date of Patent: Sep. 5, 2023

(54) DYNAMIC SWITCHING OF SEARCH SPACE CONFIGURATIONS UNDER USER EQUIPMENT CAPABILITY

(71) Applicant: QUALCOMM Incorporated, San Diego, CA (US)

(72) Inventors: Yan Zhou, San Diego, CA (US); Kazuki Takeda, Tokyo (JP); Tao Luo, San Diego, CA (US); Xiaoxia Zhang, San Diego, CA (US); Hamed Pezeshki, San Diego, CA (US); Konstantinos Dimou, San Francisco, CA (US); Mostafa Khoshnevisan, San Diego, CA (US); Seyed Ali Akbar Fakoorian, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 16/898,782

(22) Filed: Jun. 11, 2020

(65) Prior Publication Data

US 2020/0413410 A1 Dec. 31, 2020

Related U.S. Application Data

(60) Provisional application No. 62/868,681, filed on Jun. 28, 2019.

(51) Int. Cl.
*H04W 72/53* (2023.01)
*H04W 72/0446* (2023.01)
(Continued)

(52) U.S. Cl.
CPC ........... *H04W 72/53* (2023.01); *H04L 5/0055* (2013.01); *H04W 72/046* (2013.01);
(Continued)

(58) Field of Classification Search
CPC ............. H04L 5/0055; H04W 72/042; H04W 72/0446; H04W 72/046; H04W 72/0493; H04W 76/18; H04W 80/02
See application file for complete search history.

(56) References Cited

U.S. PATENT DOCUMENTS

| 8,737,251 B2 * | 5/2014 | Baker | H04W 72/042 |
| | | | 370/252 |
| 9,379,870 B2 * | 6/2016 | Feng | H04L 5/0055 |
| (Continued) | | | |

FOREIGN PATENT DOCUMENTS

| CN | 109417762 A * | 3/2019 | ........ H04W 52/0229 |
| CN | 110313210 A * | 10/2019 | ........... H04L 5/0048 |
| (Continued) | | | |

OTHER PUBLICATIONS

International Search Report and Written Opinion—PCT/US2020/037474—ISA/EPO—Sep. 18, 2020.

*Primary Examiner* — Eric Nowlin
(74) *Attorney, Agent, or Firm* — Harrity & Harrity LLP/Qualcomm Incorporated

(57) ABSTRACT

Various aspects of the present disclosure generally relate to wireless communication. In some aspects, a base station may determine a result associated with an initial set of transmissions of a periodic transmission cycle, and switch a search space configuration set to be used for one or more slots of the periodic transmission cycle based at least in part on the result, the search space configuration set being switched to a candidate search space configuration set. In some aspects, a user equipment may determine that a search space configuration set to be used for a slot of a periodic transmission cycle is to be switched based at least in part on a result associated with an initial set of transmissions of the periodic transmission cycle; and switch the search space configuration, the search space configuration set being
(Continued)

switched to a candidate search space configuration set. Numerous other aspects are provided.

32 Claims, 8 Drawing Sheets

(51) Int. Cl.
| | |
|---|---|
| *H04W 72/044* | (2023.01) |
| *H04W 76/18* | (2018.01) |
| *H04L 5/00* | (2006.01) |
| *H04W 76/28* | (2018.01) |
| *H04W 80/02* | (2009.01) |
| *H04W 72/23* | (2023.01) |

(52) U.S. Cl.
CPC ....... *H04W 72/0446* (2013.01); *H04W 72/23* (2023.01); *H04W 76/18* (2018.02); *H04W 76/28* (2018.02); *H04W 80/02* (2013.01)

(56) References Cited

U.S. PATENT DOCUMENTS

| | | | | |
|---|---|---|---|---|
| 10,574,326 | B2* | 2/2020 | Hakola | H04B 7/0632 |
| 11,219,013 | B2* | 1/2022 | Kim | H04W 74/006 |
| 2014/0233481 | A1* | 8/2014 | Feng | H04L 1/1685 |
| | | | | 370/329 |
| 2016/0205669 | A1* | 7/2016 | Kusashima | H04W 72/042 |
| | | | | 370/280 |
| 2017/0331670 | A1* | 11/2017 | Parkvall | H04J 11/0079 |
| 2018/0192405 | A1* | 7/2018 | Gong | H04L 1/0045 |
| 2018/0351624 | A1* | 12/2018 | Hakola | H04B 7/0617 |
| 2019/0342777 | A1* | 11/2019 | Tiirola | H04L 5/0048 |
| 2020/0314898 | A1* | 10/2020 | Sun | H04L 1/1819 |
| 2020/0351840 | A1* | 11/2020 | Zhou | H04L 1/1893 |
| 2020/0351847 | A1* | 11/2020 | Kim | H04L 5/0096 |
| 2020/0367160 | A1* | 11/2020 | Braun | H04W 52/0229 |
| 2020/0389874 | A1* | 12/2020 | Lin | H04L 5/0053 |
| 2021/0037558 | A1* | 2/2021 | Xu | H04W 72/042 |
| 2021/0194638 | A1* | 6/2021 | Beale | H04L 5/006 |
| 2021/0235469 | A1* | 7/2021 | Mu | H04L 5/0094 |
| 2021/0345342 | A1* | 11/2021 | Sakhnini | H04L 25/0226 |
| 2021/0385008 | A1* | 12/2021 | Hang | H04L 5/0094 |
| 2022/0116875 | A1* | 4/2022 | Nimbalker | H04W 52/0216 |
| 2022/0150946 | A1* | 5/2022 | Tsai | H04W 76/28 |
| 2022/0191964 | A1* | 6/2022 | Sebire | H04W 76/28 |

FOREIGN PATENT DOCUMENTS

| | | | | | |
|---|---|---|---|---|---|
| CN | 110475211 | A | * | 11/2019 | |
| CN | 111357389 | A | * | 6/2020 | ........... H04W 24/08 |
| CN | 110475211 | B | * | 9/2021 | |
| CN | 113439480 | A | * | 9/2021 | ........... H04W 16/14 |
| CN | 113728576 | A | * | 11/2021 | ........... H04L 1/1812 |
| EP | 2562954 | A1 | * | 2/2013 | ........... H04L 1/1685 |
| EP | 2748962 | B1 | * | 12/2017 | ........... H04L 1/1685 |
| EP | 3350938 | A1 | * | 7/2018 | ........... H04B 7/0695 |
| EP | 3566518 | A1 | * | 11/2019 | ........... H04L 5/0048 |
| EP | 3908067 | A1 | * | 1/2020 | |
| EP | 3566518 | A4 | * | 9/2020 | ........... H04L 5/0048 |
| EP | 3711450 | A1 | * | 9/2020 | ........... H04W 24/08 |
| EP | 3716697 | A1 | * | 9/2020 | ........... H04L 5/0044 |
| EP | 3350938 | B1 | * | 6/2021 | ........... H04W 16/28 |
| EP | 3890206 | A1 | * | 10/2021 | ........... H04B 7/0695 |
| EP | 3890425 | A1 | * | 10/2021 | ........... H04W 74/00 |
| EP | 3893582 | A1 | * | 10/2021 | .............. H04L 5/00 |
| EP | 4072056 | A1 | * | 10/2022 | |
| FI | 109417762 | A | | 3/2019 | |
| KR | 20200088305 | A | * | 7/2020 | ........ H04W 72/0446 |
| KR | 102174648 | B1 | * | 11/2020 | ........... H04L 5/0096 |
| KR | 20200127050 | A | * | 11/2020 | ........... H04W 72/042 |
| KR | 102306754 | B1 | * | 9/2021 | ........... H04L 5/0053 |
| KR | 20210116715 | A | * | 9/2021 | ........... H04L 5/0053 |
| KR | 102307442 | B1 | * | 10/2021 | |
| RU | 2730912 | C1 | * | 8/2020 | ........... H04L 5/0048 |
| TW | 202046672 | A | * | 12/2020 | ........... H04L 1/1819 |
| WO | WO-2013029946 | A1 | * | 3/2013 | ........... H04L 1/1685 |
| WO | WO-2017045694 | A1 | * | 3/2017 | ........... H04B 7/0617 |
| WO | WO-2018127802 | A1 | * | 7/2018 | ........... H04L 5/0053 |
| WO | WO-2019035701 | A1 | * | 2/2019 | ........... H04L 5/0053 |
| WO | WO-2019099880 | A1 | * | 5/2019 | ........... H04W 24/08 |
| WO | WO-2019159138 | A1 | * | 8/2019 | ........... H04L 5/0053 |
| WO | WO-2020064908 | A1 | * | 4/2020 | ........... H04L 5/0053 |
| WO | WO-2020145747 | A1 | * | 7/2020 | ........... H04W 74/00 |
| WO | WO-2020145748 | A1 | * | 7/2020 | ........... H04L 5/0096 |
| WO | WO-2020145750 | A1 | * | 7/2020 | ........ H04W 72/042 |
| WO | WO-2020197743 | A1 | * | 10/2020 | ........... H04L 1/1819 |
| WO | WO-2020226827 | A1 | * | 11/2020 | ........... H04L 1/1812 |
| WO | WO-2021138906 | A1 | * | 7/2021 | ........... H04L 5/0098 |
| WO | WO-2021160855 | A1 | * | 8/2021 | ........ H04W 52/0229 |
| WO | WO-2021186206 | A1 | * | 9/2021 | ........... H04L 5/0094 |
| WO | WO-2022128309 | A1 | * | 6/2022 | ........... H04L 1/0038 |
| WO | WO-2022214304 | A1 | * | 10/2022 | |

* cited by examiner

DYNAMIC SWITCHING OF SEARCH SPACE CONFIGURATIONS UNDER USER EQUIPMENT CAPABILITY

CROSS-REFERENCE TO RELATED APPLICATION

This Patent Application claims priority to U.S. Provisional Patent Application No. 62/868,681, filed on Jun. 28, 2019, entitled "DYNAMIC SWITCHING OF SEARCH SPACE CONFIGURATIONS UNDER USER EQUIPMENT CAPABILITY," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for dynamic switching of search space configurations under user equipment (UE) capability.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include determining that a search space configuration set to be used for one or more slots of a periodic transmission cycle is to be switched, wherein the search space configuration set is to be switched is based at least in part on a result associated with an initial set of transmissions of the periodic transmission cycle; and switching the search space configuration set based at least in part on determining that the search space configuration set is to be switched, wherein the search space configuration set is switched to a candidate search space configuration set.

In some aspects, a UE for wireless communication may include memory and one or more processors operatively coupled to the memory. The memory and the one or more processors may be configured to determine that a search space configuration set to be used for one or more slots of a periodic transmission cycle is to be switched, wherein the search space configuration set is to be switched is based at least in part on a result associated with an initial set of transmissions of the periodic transmission cycle; and switch the search space configuration set based at least in part on determining that the search space configuration set is to be switched, wherein the search space configuration set is switched to a candidate search space configuration set.

In some aspects, a non-transitory computer-readable medium may store one or more instructions for wireless communication. The one or more instructions, when executed by one or more processors of a UE, may cause the one or more processors to: determine that a search space configuration set to be used for one or more slots of a periodic transmission cycle is to be switched, wherein the search space configuration set is to be switched is based at least in part on a result associated with an initial set of transmissions of the periodic transmission cycle; and switch the search space configuration set based at least in part on determining that the search space configuration set is to be switched, wherein the search space configuration set is switched to a candidate search space configuration set.

In some aspects, an apparatus for wireless communication may include means for determining that a search space configuration set to be used for one or more slots of a periodic transmission cycle is to be switched, wherein the search space configuration set is to be switched is based at least in part on a result associated with an initial set of transmissions of the periodic transmission cycle; and means for switching the search space configuration set based at least in part on determining that the search space configuration set is to be switched, wherein the search space configuration set is switched to a candidate search space configuration set.

In some aspects, a method of wireless communication, performed by a base station, may include determining a result associated with an initial set of transmissions of a periodic transmission cycle; and switching a search space configuration set to be used for one or more slots of the periodic transmission cycle based at least in part on the result associated with the initial set of transmissions, wherein the search space configuration set is switched to a candidate search space configuration set.

In some aspects, a base station for wireless communication may include memory and one or more processors operatively coupled to the memory. The memory and the one or more processors may be configured to determine a result associated with an initial set of transmissions of a periodic transmission cycle; and switch a search space configuration set to be used for one or more slots of the periodic transmission cycle based at least in part on the result associated with the initial set of transmissions, wherein the search space configuration set is switched to a candidate search space configuration set.

In some aspects, a non-transitory computer-readable medium may store one or more instructions for wireless communication. The one or more instructions, when executed by one or more processors of a base station, may cause the one or more processors to: determine a result associated with an initial set of transmissions of a periodic transmission cycle; and switch a search space configuration set to be used for one or more slots of the periodic transmission cycle based at least in part on the result associated with the initial set of transmissions, wherein the search space configuration set is switched to a candidate search space configuration set.

In some aspects, an apparatus for wireless communication may include means for determining a result associated with an initial set of transmissions of a periodic transmission cycle; and means for switching a search space configuration set to be used for one or more slots of the periodic transmission cycle based at least in part on the result associated with the initial set of transmissions, wherein the search space configuration set is switched to a candidate search space configuration set.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
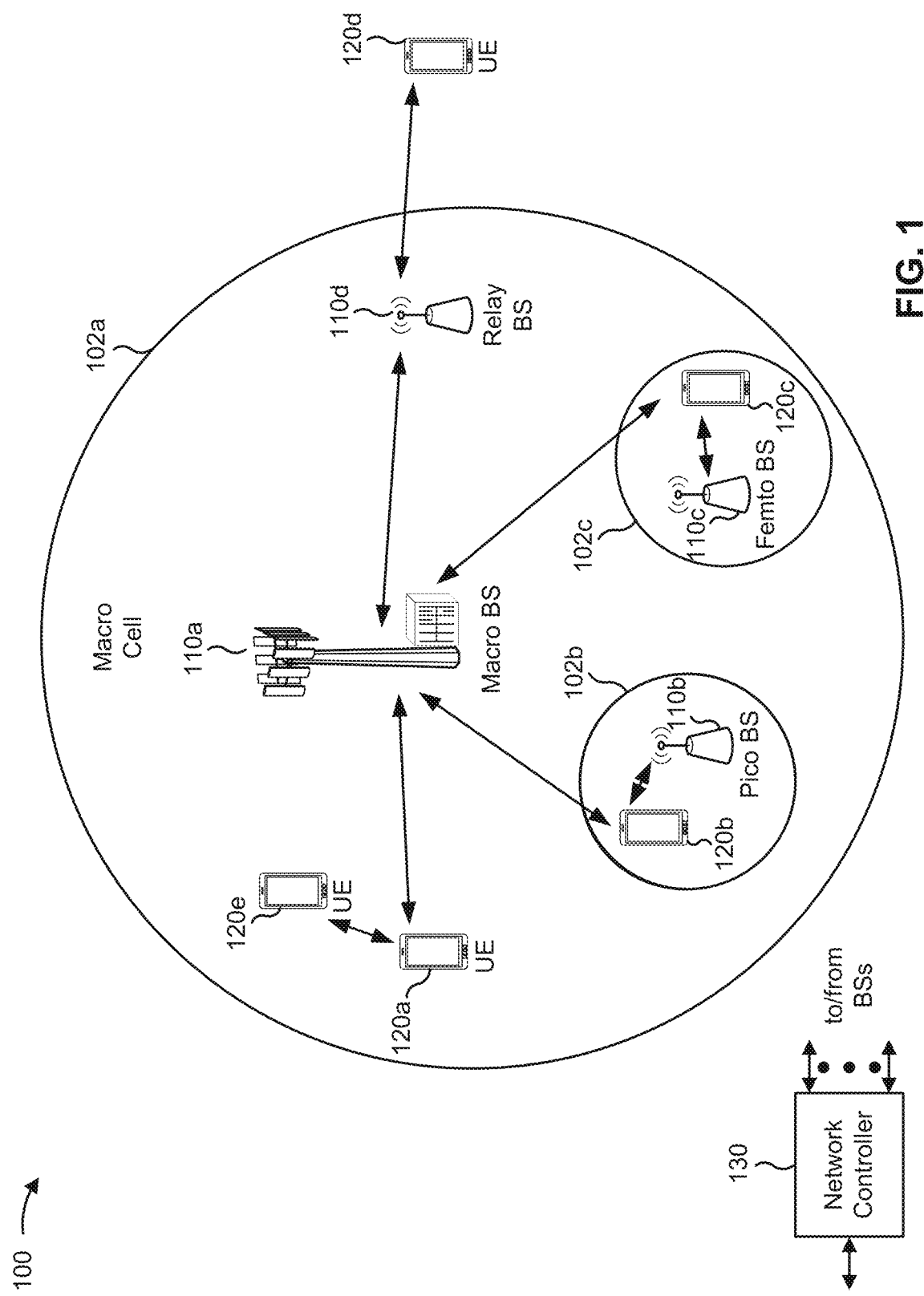
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
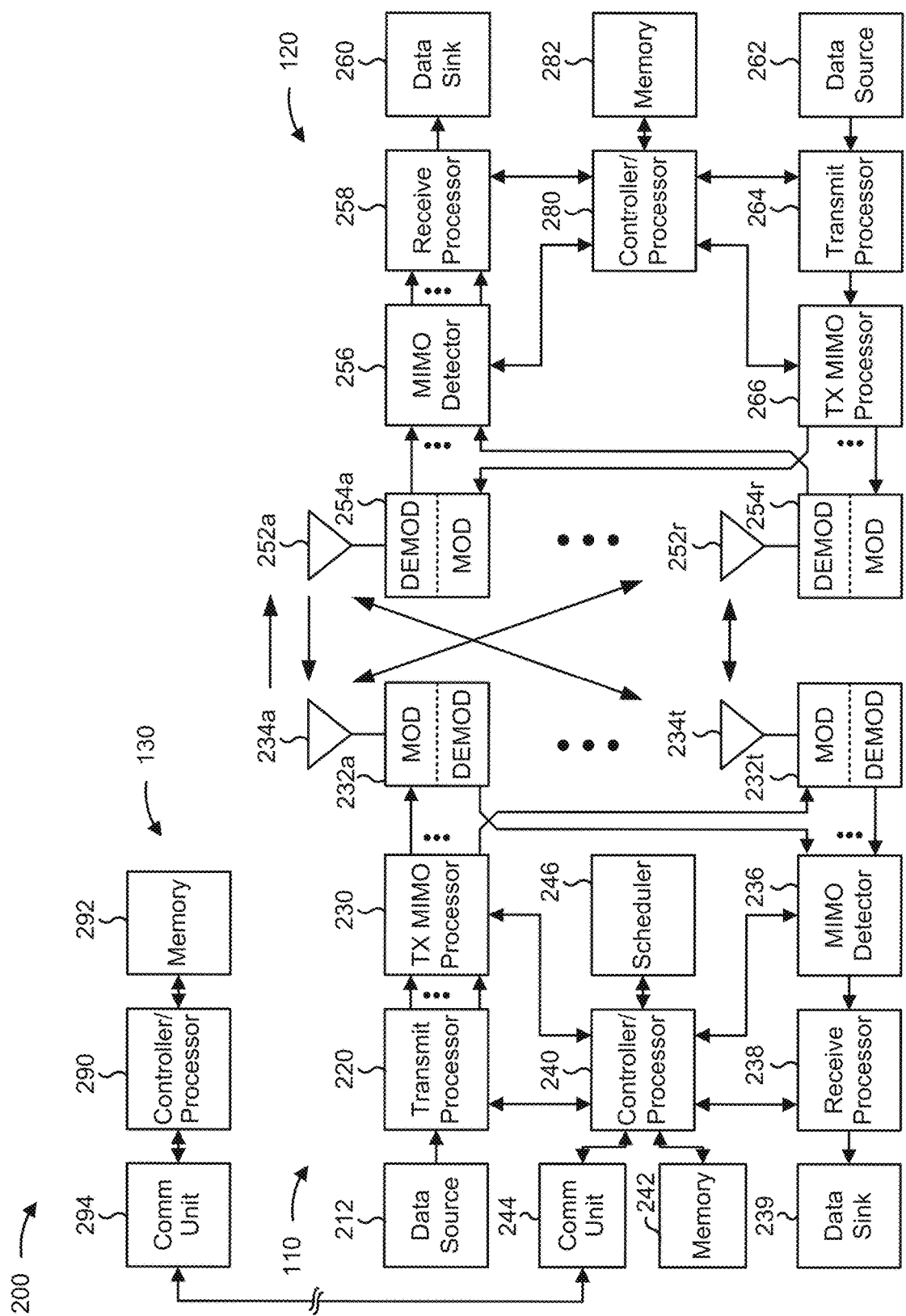
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with dynamic switching of search space configurations under UE capability, as described in more detail elsewhere herein. For example, controller/processor 240 of base station 110, controller/processor 280 of UE 120, and/or any other component(s) of FIG. 2 may perform or direct operations of, for example, process 6 of FIG. 6, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direction operations of, for example, process 600 of FIG. 6, process 700 of FIG. 7, and/or other processes as described herein. A scheduler 246 may schedule UEs for data transmission on the downlink and/or uplink.

In some aspects, UE 120 may include means for determining that a search space configuration set to be used for one or more slots of a periodic transmission cycle is to be switched, wherein the search space configuration set is to be switched is based at least in part on a result associated with an initial set of transmissions of the periodic transmission cycle (e.g., using antenna 252, DEMOD 254, MIMO detector 256, receive processor 258, controller/processor 280, memory 282, and/or the like); means for switching the search space configuration set based at least in part on determining that the search space configuration set is to be switched, wherein the search space configuration set is switched to a candidate search space configuration set (e.g., using controller/processor 280, transmit processor 264, TX MIMO processor 266, MOD 254, antenna 252, and/or the like); and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a result associated with an initial set of transmissions of a periodic transmission cycle (e.g., using antenna 234, DEMOD 232, MIMO detector 236, receive processor 238, controller/processor 240, and/or the like); means for switching a search space configuration set to be used for one or more slots of the periodic transmission cycle based at least in part on the result associated with the initial set of transmissions, wherein the search space configuration set is switched to a candidate search space configuration set (e.g., using controller/processor 240, transmit processor 220, TX MIMO processor 230, MOD 232, antenna 234, and/or the like); and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
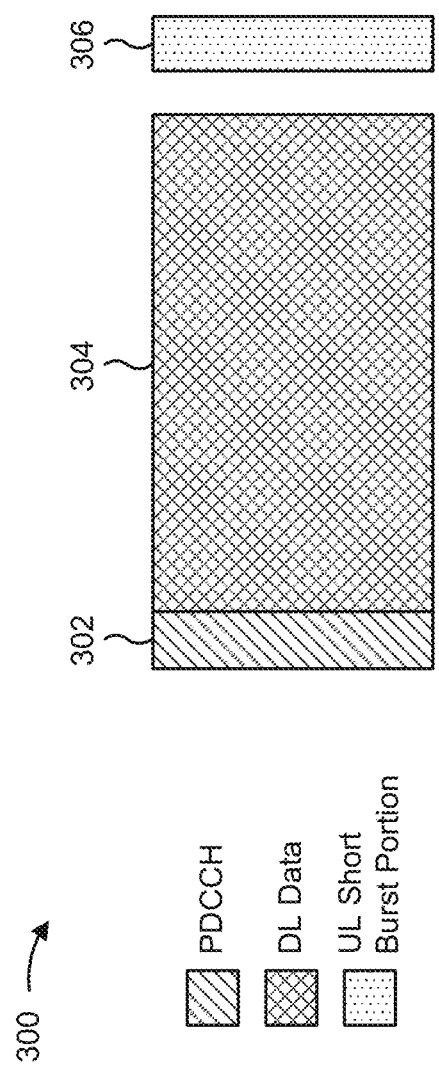
FIG. 3 is a diagram illustrating an example of a downlink (DL)-centric slot, in accordance with various aspects of the present disclosure.

FIG. 3 is a diagram 300 showing an example of a DL-centric slot or wireless communication structure. The DL-centric slot may include a control portion 302. The control portion 302 may exist in the initial or beginning portion of the DL-centric slot. The control portion 302 may include various scheduling information and/or control information corresponding to various portions of the DL-centric slot. In some configurations, the control portion 302 may be a physical DL control channel (PDCCH), as indicated in FIG. 3. In some aspects, the control portion 302 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric slot may also include a DL data portion 304. The DL data portion 304 may sometimes be referred to as the payload of the DL-centric slot. The DL data portion 304 may include the communication resources utilized to communicate DL data from the scheduling entity (e.g., UE or BS) to the subordinate entity (e.g., UE). In some configurations, the DL data portion 304 may be a physical DL shared channel (PDSCH).

The DL-centric slot may also include an UL short burst portion 306. The UL short burst portion 306 may sometimes be referred to as an UL burst, an UL burst portion, a common UL burst, a short burst, an UL short burst, a common UL short burst, a common UL short burst portion, and/or various other suitable terms. In some aspects, the UL short burst portion 306 may include one or more reference signals. Additionally, or alternatively, the UL short burst portion 306 may include feedback information corresponding to various other portions of the DL-centric slot. For example, the UL short burst portion 306 may include feedback information corresponding to the control portion 302 and/or the data portion 304. Non-limiting examples of information that may be included in the UL short burst portion 306 include an ACK signal (e.g., a physical uplink control channel (PUCCH) ACK, a physical uplink shared channel (PUSCH) ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 306 may include additional or alternative information, such as information pertaining to random access channel (RACH) procedures, scheduling requests, and various other suitable types of information.

As illustrated in FIG. 3, the end of the DL data portion 304 may be separated in time from the beginning of the UL short burst portion 306. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 3 is provided as an example. Other examples may differ from what is described with regard to FIG. 3.

Figure 4:
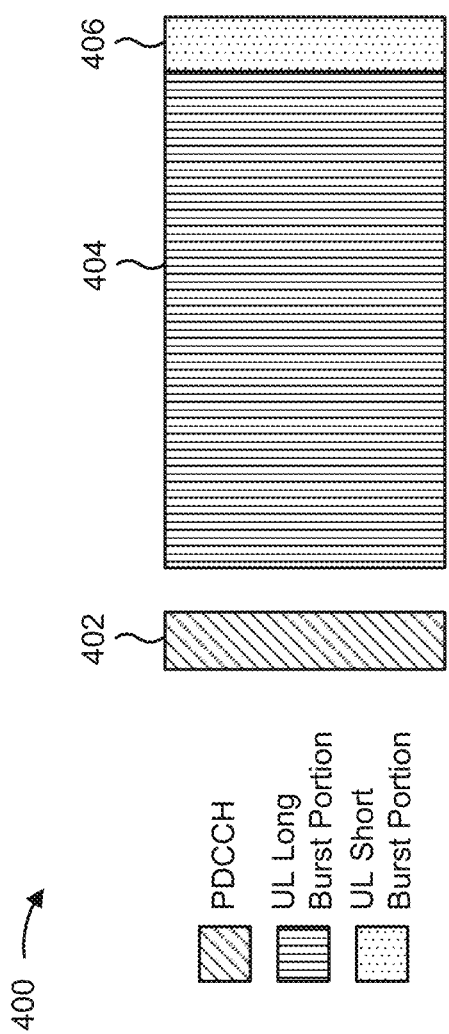
FIG. 4 is a diagram illustrating an example of an uplink (UL)-centric slot, in accordance with various aspects of the present disclosure.

FIG. 4 is a diagram 400 showing an example of an UL-centric slot or wireless communication structure. The UL-centric slot may include a control portion 402. The control portion 402 may exist in the initial or beginning portion of the UL-centric slot. The control portion 402 in FIG. 4 may be similar to the control portion 302 described above with reference to FIG. 3. The UL-centric slot may also include an UL long burst portion 404. The UL long burst portion 404 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 402 may be a physical DL control channel (PDCCH).

As illustrated in FIG. 4, the end of the control portion 402 may be separated in time from the beginning of the UL long burst portion 404. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 406. The UL short burst portion 406 in FIG. 4 may be similar to the UL short burst portion 306 described above with reference to FIG. 3, and may include any of the information described above in connection with FIG. 3. The foregoing is one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 4 is provided as an example. Other examples may differ from what is described with regard to FIG. 4.

In a wireless communication system, such as an NR system, a UE may search for control information (e.g., a PDCCH) based on a search space configuration set configured on the UE. The search space configuration set is a configuration that identifies a set of search spaces (e.g., each one or more symbols in length) in which the UE is to search for the control information. Typically, the search space configuration set used by the UE can be changed from one search space configuration set to another search space configuration set, as desired by the base station, via radio resource control (RRC) signaling. However, a comparatively faster change of the search space configuration set is desirable in some cases, such as when switching a search space configuration set based on a result of an initial transmission in a periodic transmission cycle. In such cases, switching the search space configuration via RRC signaling can introduce an undesirable amount of latency. This latency is of particular concern, for example, for traffic that requires high reliability and low latency (e.g., ultra-reliable low-latency communication (URLLC) traffic).

Some aspects described herein provide techniques and apparatuses for dynamic switching of search space configuration under a UE capability constraint. In some aspects, as described in further detail below, a search space configuration set can be dynamically switched from one search space configuration set to another search space configuration set (e.g., within a single transmission cycle) based at least in part on a result associated with an initial set of transmissions. In some aspects, the switching of the search space configuration set may be signaled via downlink control information (DCI), a medium access control (MAC) control element, or based at least in part on Layer 1 signaling, control information, or messaging (e.g., an acknowledgment (ACK) or negative acknowledgment (NACK) associated with the initial transmission), as described below.

The dynamic switching of the search space configuration set used by the UE in the manner described herein reduces latency associated with switching the search space configuration, thereby improving performance associated with, for example, traffic that requires high reliability and low latency (e.g., URLLC traffic).

Figure 5A:
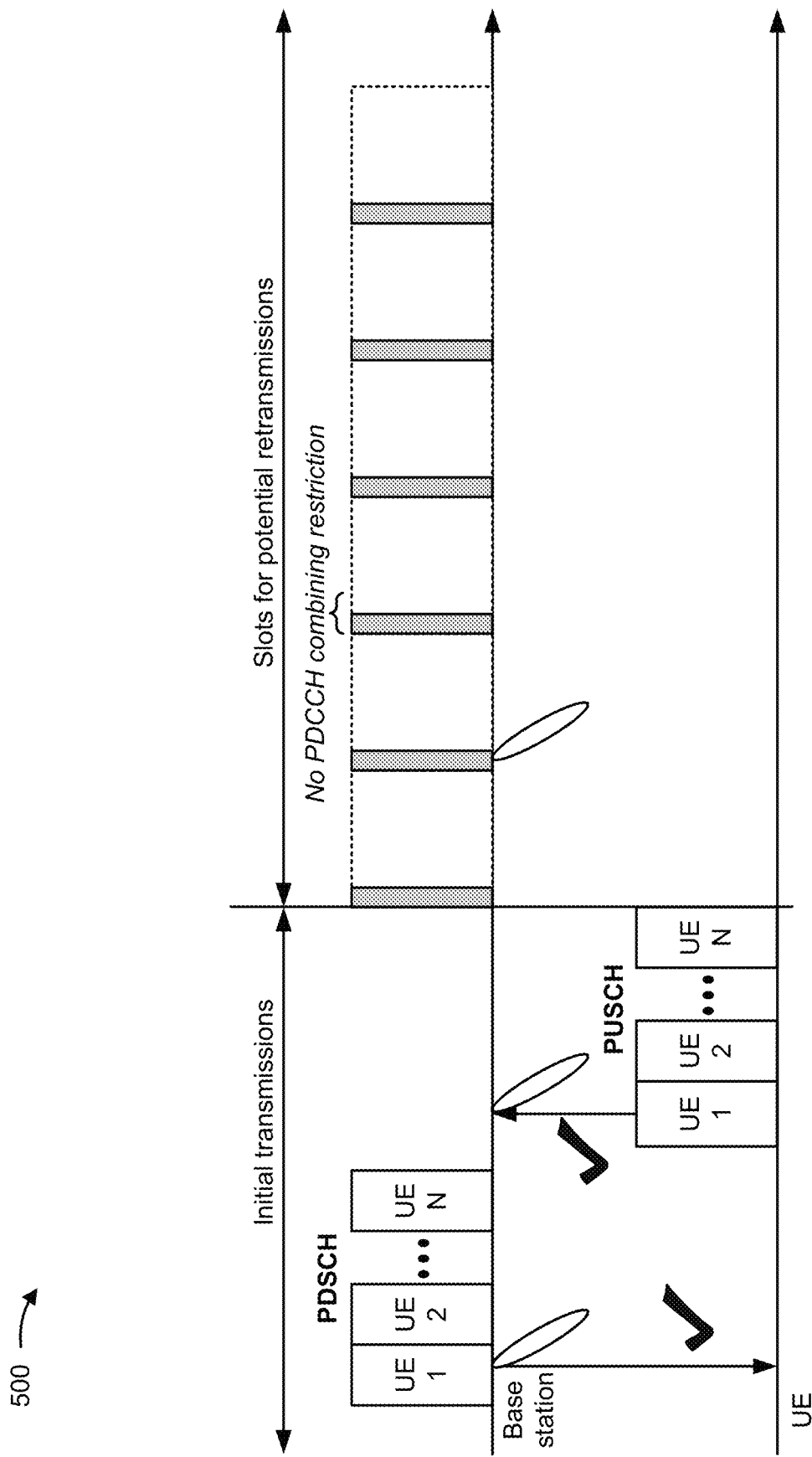
FIGS. 5A and 5B are diagrams illustrating examples associated with dynamic switching of search space configurations under UE capability, in accordance with various aspects of the present disclosure.
Figure 5B:
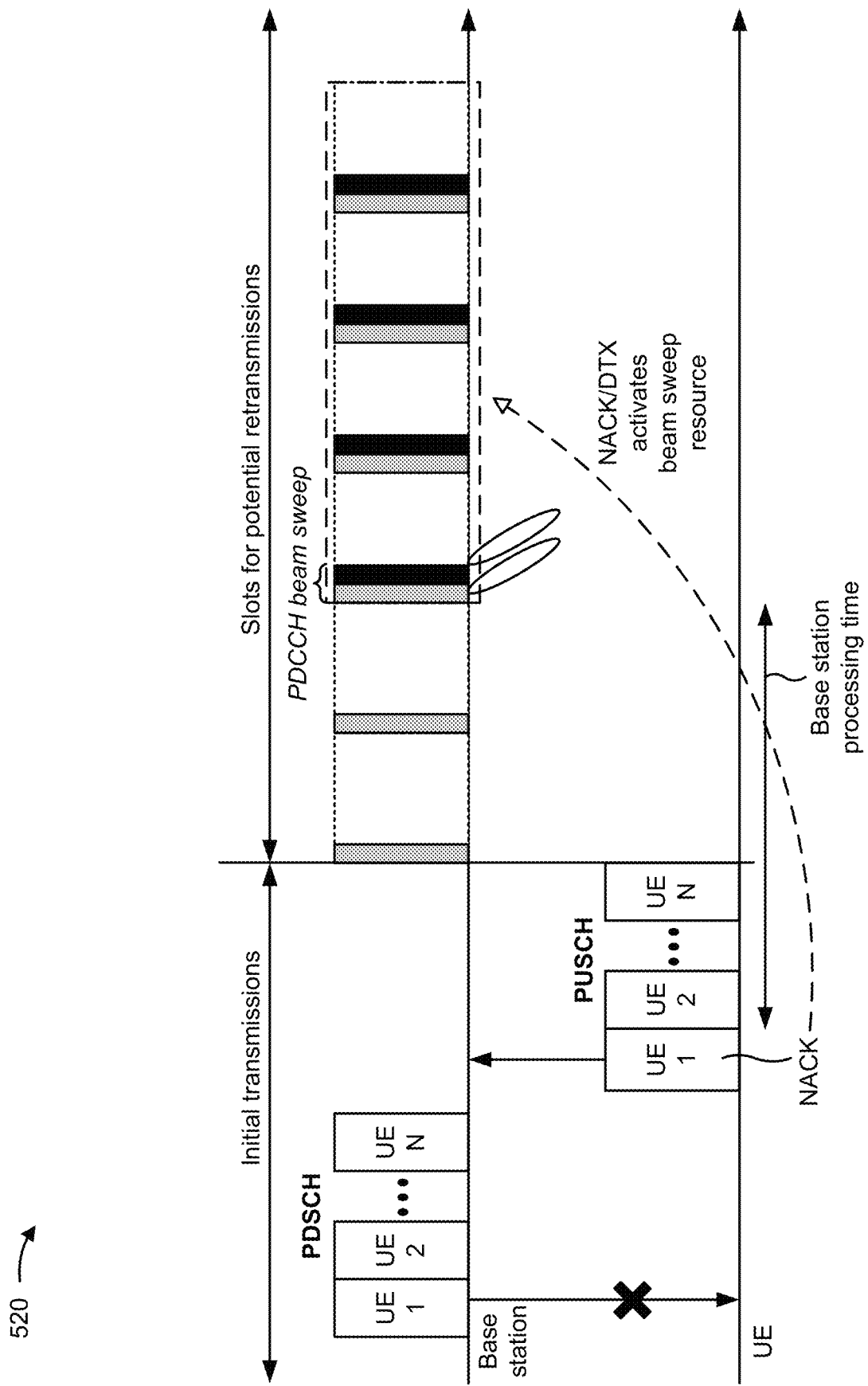

FIGS. 5A and 5B are diagrams illustrating examples associated with dynamic switching of search space configurations under UE capability, in accordance with various aspects of the present disclosure.

As described in the examples below, in some aspects, a base station (e.g., base station 110) may determine a result associated with an initial set of transmissions of a periodic transmission cycle, and may switch a search space configuration set to be used for one or more slots of the periodic transmission cycle based at least in part on the result. As further described in the below examples, in some aspects, a UE (e.g., UE 120) may determine that the search space configuration set is to be switched (e.g., based at least in part on an indication signaled by the base station), and may switch the search space configuration set, accordingly.

FIG. 5A is a diagram illustrating a first example 500 of dynamic switching of a search space configuration. As shown in FIG. 5A, in some aspects, a base station may transmit an initial downlink transmission (e.g., a PDSCH communication) to a particular UE (UE1) using a particular beam and in a particular set of downlink resources (e.g., a set of downlink resources assigned to UE1) during a transmission cycle (e.g., a periodic transmission cycle). As indicated in FIG. 5A, in example 500, UE1 may successfully receive the initial downlink transmission and may transmit an ACK in an initial uplink transmission (e.g., a PUSCH communication) to the base station using a particular set of uplink resources (e.g., a set of uplink resources assigned to UE1) during the transmission cycle.

In this example, the base station may determine (e.g., based at least in part on receiving the uplink transmission, based at least in part on the ACK, and/or the like) that the initial downlink transmission and the initial uplink transmission were successful. Thus, in this example, the result associated with the initial set of transmissions is a successful downlink transmission and a successful uplink transmission.

In some aspects, the base station may switch a search space configuration set to be used for one or more slots of the periodic transmission cycle based at least in part on the result indicating a successful downlink transmission and a successful uplink transmission. For example, based at least in part on the result indicating the successful downlink and uplink transmissions, the base station may select a candidate search space configuration set, of a plurality of candidate search space configuration sets, to be used for one or more slots of the transmission cycle. Thus, in some aspects, switching the search space configuration set may include selecting the candidate search space configuration set and configuring the base station to use the selected candidate search space configuration set for transmitting control information in the one or more other slots of the transmission cycle (e.g., one or more slots used for retransmissions). Further, in some aspects, switching the search space configuration set may include signaling UE1 to use the selected candidate search space configuration set.

In some aspects, the base station may signal, to UE1, an explicit indication associated with switching the search space configuration set. In some aspects, the explicit indication can be signaled via downlink control information (DCI), a medium access control (MAC) control element, and/or the like. For example, UE1 may be provided a location of a search space configuration set (also referred to as a search space set) switching field for a serving cell in a particular DCI format (e.g., DCI format 2_0). Here, the base station may transmit, and UE1 may detect the particular DCI format in a slot. If a value of the search space set switching field is set to a first group index (e.g., index 0) and the UE1 is not monitoring PDCCH according to search space configuration sets with the first group index, then UE1 may start monitoring PDCCH according to search space sets with the first group index, and may stop monitoring PDCCH according to search space sets with a second group index (e.g., index 1) on a serving cell at an upcoming slot (e.g., a first slot that is a particular number of symbols after a last symbol of the PDCCH with the particular DCI format). Similarly, if the value of the search space set switching field is set to the second group index and the UE1 is not monitoring PDCCH according to search space configuration sets with the second group index, then UE1 may start monitoring PDCCH according to search space sets with the second group index, and may stop monitoring PDCCH according to search space sets with the first group index on a serving cell at an upcoming slot.

In some aspects, the base station may signal, to UE1, an implicit indication associated with switching the search space configuration set. In some aspects, the implicit indication can be signaled based at least in part on Layer 1 signaling, control information, or messaging (e.g., the indication can be implied by an ACK/NACK associated with a previous transmission). In some aspects, the implicit search space configuration set switching may be pre-configured (e.g., agreed upon by the UE and the base station) upon an RRC connection, establishment, reestablishment, or the like, that dictates one or more rules for switching the search space configuration set based on an implicit indication. As an example, the indication implied by an ACK/NACK associated with a previous transmission, and the UE may (e.g., based at least in part on a pre-configuration associated with the implicit indication) start monitoring a search space with group index 0 whereas, prior to the implicit indication, the UE was monitoring a search with group index 1.

In some aspects, when the result associated with the initial set of transmissions is a successful downlink transmission and a successful uplink transmission (as in the case of example 500), the base station may switch the search space configuration set to a candidate search space configuration set that comprises a search space configuration having a single search space with a single symbol. In some aspects, a beam used for transmission in the one or more slots after such a search space configuration set switch may be the same beam as that used for the initial set of transmissions (e.g., since the beam was successfully used for the initial set of transmissions). In some aspects, using a search space configuration having a single search space with a single symbol reduces control overhead.

In some aspects, the candidate search space configuration set may be one of a plurality of candidate search space configuration sets that is pre-configured by the base station on UE1. In some aspects, the plurality of candidate search space configurations may be configured via, for example, RRC signaling. In some aspects, each of the plurality of candidate search space configuration sets may be associated with a respective index. In some aspects, these indices can be configured on the UE and, therefore, can be used by the base station for explicitly indicating the switch of the search space configuration set to the selected search space configuration set. In some aspects, each of the plurality of candidate search space configuration sets may be associated with a respective Layer 1 signal, item of control information, message, and/or the like. In some aspects, these associations can be configured on the UE and, therefore, can be used by the base station for implicitly indicating the switch of the search space configuration set to the selected search space configuration set.

In some aspects, for a given candidate search space configuration set, at least one search space identifier associated with the candidate search space configuration set may be unique to the candidate search space configuration set (i.e., the candidate search space configuration set may have at least one search space identifier that is different from those in other candidate search space configuration sets).

In some aspects, for a given search space configuration set, at least one search space identifier associated with the candidate search space configuration set may not be unique to the candidate search space configuration set (i.e., the candidate search space configuration set may have at least one search space identifier that is the same as those in another candidate search space configuration set).

In some aspects, for a given candidate search space configuration set, at least one search space identifier may be unique to the candidate search space configuration set and at least one search space identifier may not be unique to the candidate search space configuration set (i.e., the candidate search space configuration set can have at least one search space identifier that differs from those of other candidate search space configuration sets and at least one search space identifier that is the same as those in another candidate search space configuration set). In some aspects, when at least one search space identifier associated with the candidate search space configuration set is not unique to the candidate search space configuration set, a search space parameter, associated with the at least one search space identifier in the search space configuration set, may differ among the plurality of candidate search space configuration sets. In some aspects, the search space parameter may include, for example, a time duration, a period, a control resource set (CORESET) identifier, a beam, a number of PDCCH candidates per aggregation level, a DCI format, and/or the like.

Generally, for a given candidate search space configuration set, a total number of PDCCH candidates for all search spaces in a slot shall not exceed a limit allowed by UE capability. In some aspects, ensuring that the UE capability limitation is satisfied can be achieved by explicit configuration of PDCCH candidates per search space in each candidate search space configuration set (e.g., to ensure the total number of PDCCH candidates for all search spaces in a slot does not exceed a UE capability limit). Thus, in some aspects, a number of PDCCH candidates per search space may be explicitly identified in the candidate search space configuration set.

Additionally, or alternatively, ensuring that the UE capability limitation is satisfied can be achieved by an implicit rule (without explicit configuration of PDCCH candidates per search space in each candidate search space configuration set). For example, the number of PDCCH candidates per search space may be determined by dividing a fixed total number of allowable candidates by a number of search space configurations in a given search space configuration set. As a particular example, a first candidate search space configuration set may have a search space 0 with a total of ten PDCCH candidates, and a second candidate search space configuration set may have search space 0 and search space 1 with five PDCCH candidates per search space. Thus, in some aspects, a number of PDCCH candidates per search space may be based at least in part on a number of search spaces associated with the candidate search space configuration set and a capability of UE1.

In some aspects, the base station may signal the indication to switch to the selected candidate search space configuration set (e.g., at a start of a set of slots used for potential retransmissions). As further shown in FIG. 5A, after switching the search space configuration set to the selected candidate search space configuration set, the base station may transmit control information in the one or more other slots according to the selected candidate search space configuration set. For example, when the candidate search space configuration set comprises a search space configuration having a single search space with a single symbol, the base station may transmit control information in the one or more slots of the transmission cycle in accordance with the candidate search space configuration set.

In some aspects, UE1 may determine that the search space configuration set to be used for the one or more slots is to be switched, and may switch the search space configuration set accordingly. For example, UE1 may determine that the search space configuration is to be switched based at least in part on an explicit or implicit indication signaled by the base station, as described above, and may switch the search space configuration set accordingly. In some aspects, as indicated above, the search space configuration set is switched based at least in part on a result associated with an initial set of transmissions of the periodic transmission cycle, as described above. In some aspects, UE1 may switch the search space configuration set to the selected search space configuration set (e.g., as indicated by the base station), and may attempt to receive information in the one or more slots of the periodic transmission cycle according to the selected candidate search space configuration set (e.g., by searching search spaces identified by the selected candidate search space configuration set).

FIG. 5B is a diagram illustrating a second example 520 of dynamic switching of a search space configuration. As shown in FIG. 5B, in some aspects, a base station may transmit an initial downlink transmission (e.g., a PDSCH communication) to a particular UE (UE1) using a particular beam and in a particular set of downlink resources (e.g., a set of downlink resources assigned to UE1) during a transmission cycle (e.g., a periodic transmission cycle). As indicated in FIG. 5B, in example 520, UE1 does not successfully receive the initial downlink transmission and, therefore, may transmit a NACK in an initial uplink transmission (e.g., a PUSCH communication) to the base station using a particular set of uplink resources (e.g., a set of uplink resources assigned to UE1) during the transmission cycle. As another example, the UE may fail to receive the downlink transmission due to poor beam quality. Here, when transmitting a subsequent uplink transmission to the base station, the uplink transmission may be a discontinuous transmission (DTX).

In this example, the base station may determine (e.g., based at least in part on the NACK, based at least in part on the DTX, based at least in part on failing to receive the uplink transmission, and/or the like) that at least one of the initial downlink transmission or the initial uplink transmission failed. Thus, in this example, the result associated with the initial set of transmissions is a failure of at least one of a downlink transmission or an uplink transmission.

In some aspects, the base station may expect to receive feedback associated with the initial downlink transmission in a particular set of resources (e.g., the base station may expect to receive an ACK or a NACK in a particular set of frequency/time resources). Here, when the base station does not receive feedback in the particular set of resources (e.g., when an ACK was transmitted by the UE but not received by the base station or when a NACK was transmitted by the UE but was not received by the base station), the base station may determine that the result associated with the initial set of transmissions is a failure of at least one of the downlink transmission or the uplink transmission. In some aspects, the UE may be configured (e.g., based at least in part on an agreement with the base station during establishment of an RRC connection) to expect PDCCH beam sweeping to occur after the UE transmits a NACK. Here, candidate search space configuration sets should be preconfigured on the UE to permit the UE to switch to a candidate search space configuration set (e.g., since, per the agreement with the base station, the UE may determine that the search space configuration set is to be switched when the UE transmits a NACK).

In some aspects, the base station may switch a search space configuration set to be used for one or more slots of the periodic transmission cycle based at least in part on the result indicating a failure of at least one of the downlink transmission or the uplink transmission. For example, based at least in part on the result indicating the failure, the base station may select a candidate search space configuration set, of a plurality of candidate search space configuration sets, to be used for one or more slots of the transmission cycle. Thus, in some aspects, switching the search space configuration set may include selecting the candidate search space configuration set, configuring the base station to use the selected candidate search space configuration set, and signaling UE1 to use the selected candidate search space configuration set, as described above with reference to FIG. 5A. In some aspects, the base station may signal, to UE1, an explicit indication or an implicit indication associated with switching the search space configuration set, as described above.

In some aspects, when the result associated with the initial set of transmissions is a failure of at least one of the downlink transmission or the uplink transmission (as in the case of example 520), the base station may switch the search space configuration set to a candidate search space configuration set that comprises a search space configuration having a plurality of search spaces associated with a plurality of beams (e.g., at least two search spaces, each comprising one or more symbols and being associated with a different beam). In some aspects, one or more beams used for transmission in the one or more slots after such a search space configuration set switch may be in addition to and/or may be different from the beam used for the initial set of transmissions (e.g., since the beam was unsuccessfully used for the initial set of transmissions).

In some aspects, the base station may signal the indication to switch to the selected candidate search space configuration set (e.g., at a start of a set of slots used for potential retransmissions). As further shown in FIG. 5B, after switching the search space configuration set to the selected candidate search space configuration set, the base station may transmit control information in one or more other slots according to the selected candidate search space configuration set. For example, when the candidate search space configuration set comprises a search space configuration having a plurality of search spaces associated with a plurality of beams, the base station may transmit control information in one or more slots of the transmission cycle in accordance with the candidate search space configuration set (e.g., after a processing time associated with initiating transmissions on one or more beams associated with the selected search space configuration set).

In some aspects, UE1 may determine that the search space configuration set to be used for the one or more slots is to be switched, and may switch the search space configuration set accordingly, as described above. In some aspects, UE1 may switch the search space configuration set to the selected search space configuration set (e.g., as indicated by the base station), and may attempt to receive information in the one or more slots of the periodic transmission cycle according to the selected candidate search space configuration set (e.g., by searching search spaces identified by the selected candidate search space configuration set).

As indicated above, FIGS. 5A and 5B are provided as examples. Other examples may differ from what is described with respect to FIGS. 5A and 5B.

Figure 6:
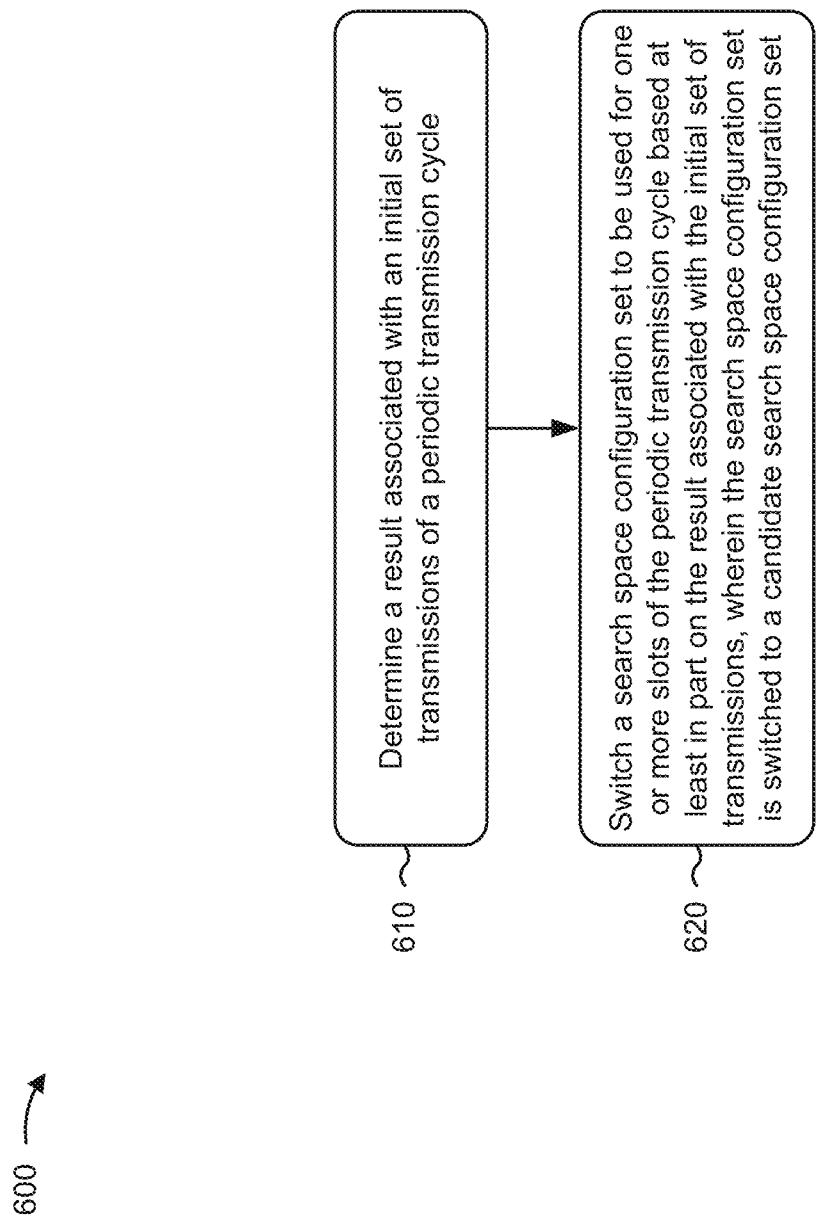
FIG. 6 is a diagram illustrating an example process performed, for example, by a base station, in accordance with various aspects of the present disclosure.

FIG. 6 is a diagram illustrating an example process 600 performed, for example, by a base station, in accordance with various aspects of the present disclosure. Example process 600 is an example where a base station (e.g., base station 110 and/or the like) performs operations associated with dynamic switching of search space configurations under UE capability.

As shown in FIG. 6, in some aspects, process 600 may include determining a result associated with an initial set of transmissions of a periodic transmission cycle (block 610). For example, the base station (e.g., using antenna 234, DEMOD 232, MIMO detector 236, receive processor 238, controller/processor 240, and/or the like) may determine a result associated with an initial set of transmissions of a periodic transmission cycle, as described above, for example, with reference to FIGS. 5A and/or 5B.

As further shown in FIG. 6, in some aspects, process 600 may include switching a search space configuration set to be used for one or more slots of the periodic transmission cycle based at least in part on the result associated with the initial set of transmissions, wherein the search space configuration set is switched to a candidate search space configuration set (block 620). For example, the base station (e.g., using controller/processor 240, transmit processor 220, TX MIMO processor 230, MOD 232, antenna 234, and/or the like) may switch a search space configuration set to be used for one or more slots of the periodic transmission cycle based at least in part on the result associated with the initial set of transmissions, as described above, for example, with reference to FIGS. 5A and/or 5B. In some aspects, the search space configuration set is switched to a candidate search space configuration set.

Process 600 may include additional aspects, such as any single aspect or any combination of aspects described below and/or in connection with one or more other processes described elsewhere herein.

In a first aspect, an indication associated with switching the search space configuration set is signaled via at least one of downlink control information (DCI); or a medium access control (MAC) control element.

In a second aspect, alone or in combination with the first aspect, an indication associated with switching the search space configuration set is signaled based at least in part on Layer 1 signaling, control information, or messaging.

In a third aspect, alone or in combination with one or more of the first and second aspects, the result associated with the initial set of transmissions is a successful downlink transmission and a successful uplink transmission.

In a fourth aspect, alone or in combination with one or more of the first through third aspects, the candidate search space configuration set comprises a search space configuration having a single search space with a single symbol.

In a fifth aspect, alone or in combination with one or more of the first through fourth aspects, the result associated with the initial set of transmissions is a failure of at least one of a downlink transmission or an uplink transmission.

In a sixth aspect, alone or in combination with one or more of the first through fifth aspects, the result is determined based at least in part on a negative acknowledgment (NACK) associated with a downlink transmission.

In a seventh aspect, alone or in combination with one or more of the first through sixth aspects, the result is determined based at least in part on a discontinuous transmission (DTX) associated with an uplink transmission.

In an eighth aspect, alone or in combination with one or more of the first through seventh aspects, the candidate search space configuration set comprises a search space configuration having a plurality of search spaces associated with a plurality of beams.

In a ninth aspect, alone or in combination with one or more of the first through eighth aspects, the candidate search space configuration set is one of a plurality of candidate search space configuration sets that is pre-configured by the base station.

In a tenth aspect, alone or in combination with one or more of the first through ninth aspects, each of the plurality of candidate search space configuration sets is associated with a respective index.

In an eleventh aspect, alone or in combination with one or more of the first through tenth aspects, each of the plurality of candidate search space configuration sets is associated with a respective Layer 1 signal, item of control information, or message.

In a twelfth aspect, alone or in combination with one or more of the first through eleventh aspects, at least one search space identifier, associated with the candidate search space configuration set, is unique to the candidate search space configuration set.

In a thirteenth aspect, alone or in combination with one or more of the first through twelfth aspects, at least one search space identifier, associated with the candidate search space configuration set, is not unique to the candidate search space configuration set.

In a fourteenth aspect, alone or in combination with one or more of the first through thirteenth aspects, a search space parameter, associated with the at least one search space identifier, differs among the plurality of candidate search space configuration sets.

In a fifteenth aspect, alone or in combination with one or more of the first through fourteenth aspects, the search space parameter includes at least one of: a time duration; a period; a control resource set (CORESET) identifier; a beam; a number of physical downlink control channel (PDCCH) candidates per aggregation level; or a downlink control information (DCI) format.

In a sixteenth aspect, alone or in combination with one or more of the first through fifteenth aspects, a number of physical downlink control channel (PDCCH) candidates per search space is explicitly identified in the candidate search space configuration set.

In a seventeenth aspect, alone or in combination with one or more of the first through sixteenth aspects, a number of physical downlink control channel (PDCCH) candidates per search space is based at least in part on a number of search spaces associated with the candidate search space configuration set and a capability of a UE (e.g., UE 120).

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
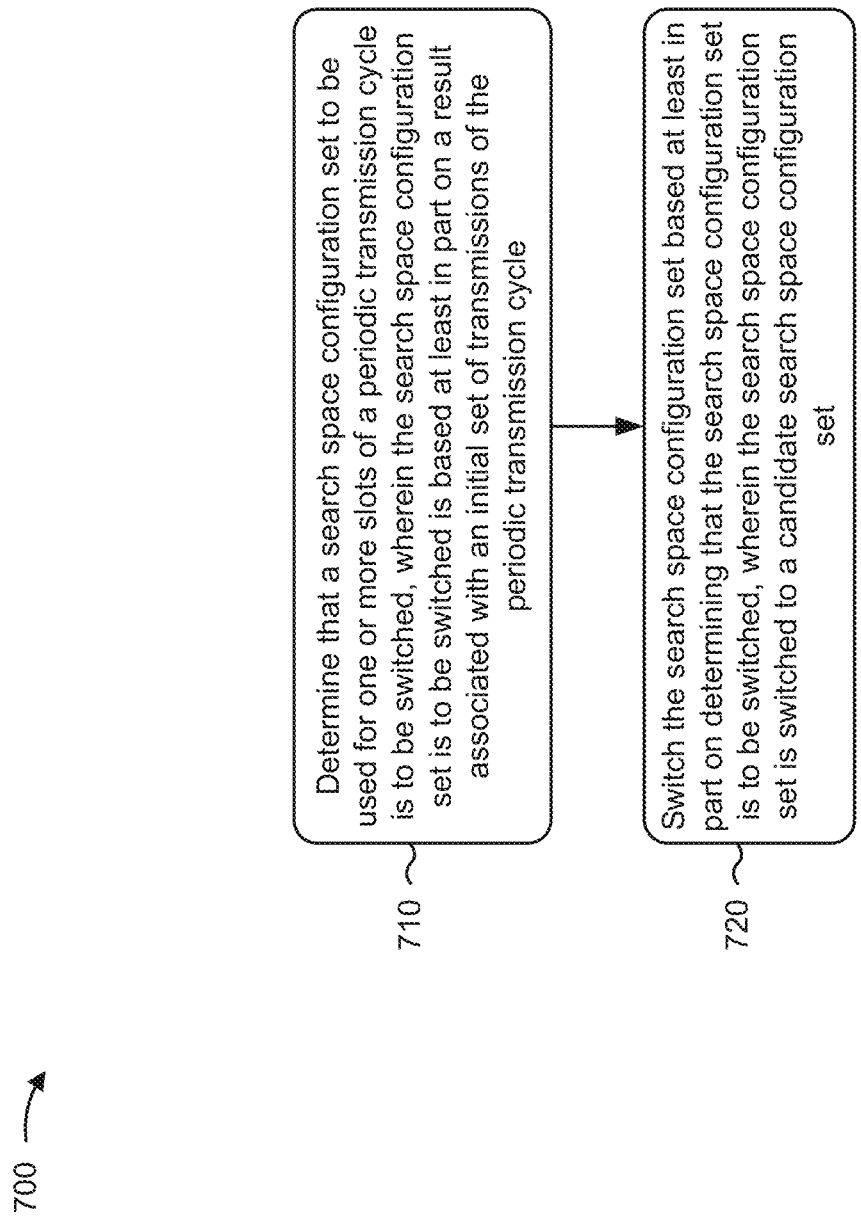
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120 and/or the like) performs operations associated with dynamic switching of search space configurations under UE capability.

As shown in FIG. 7, in some aspects, process 700 may include determining that a search space configuration set to be used for one or more slots of a periodic transmission cycle is to be switched, wherein the search space configuration set is to be switched is based at least in part on a result associated with an initial set of transmissions of the periodic transmission cycle (block 710). For example, the UE (e.g., using antenna 252, DEMOD 254, MIMO detector 256, receive processor 258, controller/processor 280, memory 282, and/or the like) may determine that a search space configuration set to be used for one or more slots of a periodic transmission cycle is to be switched, as described above, for example, with reference to FIGS. 5A and/or 5B. In some aspects, the search space configuration set is to be switched is based at least in part on a result associated with an initial set of transmissions of the periodic transmission cycle.

As further shown in FIG. 7, in some aspects, process 700 may include switching the search space configuration set based at least in part on determining that the search space configuration set is to be switched, wherein the search space configuration set is switched to a candidate search space configuration set (block 720). For example, the UE (e.g., using controller/processor 280, transmit processor 264, TX MIMO processor 266, MOD 254, antenna 252, and/or the like) may switch the search space configuration set based at least in part on determining that the search space configuration set is to be switched, as described above, for example, with reference to FIGS. 5A and/or 5B. In some aspects, the search space configuration set is switched to a candidate search space configuration set.

Process 700 may include additional aspects, such as any single aspect or any combination of aspects described below and/or in connection with one or more other processes described elsewhere herein.

In a first aspect, the determination that the search space configuration set is to be switched is based at least in part on an indication signaled via at least one of downlink control information (DCI); or a medium access control (MAC) control element.

In a second aspect, alone or in combination with the first aspect, the determination that the search space configuration set is to be switched is based at least in part on an indication signaled via Layer 1 signaling, control information, or messaging.

In a third aspect, alone or in combination with one or more of the first and second aspects, the result associated with the initial set of transmissions is a successful downlink transmission and a successful uplink transmission.

In a fourth aspect, alone or in combination with one or more of the first through third aspects, the candidate search space configuration set comprises a search space configuration having a single search space with a single symbol.

In a fifth aspect, alone or in combination with one or more of the first through fourth aspects, the result associated with the initial set of transmissions is a failure of at least one of a downlink transmission or an uplink transmission.

In a sixth aspect, alone or in combination with one or more of the first through fifth aspects, the result is determined based at least in part on a negative acknowledgment (NACK) associated with a downlink transmission.

In a seventh aspect, alone or in combination with one or more of the first through sixth aspects, the result is determined based at least in part on a discontinuous transmission (DTX) associated with an uplink transmission.

In an eighth aspect, alone or in combination with one or more of the first through seventh aspects, the candidate search space configuration set comprises a search space configuration having a plurality of search spaces associated with a plurality of beams.

In a ninth aspect, alone or in combination with one or more of the first through eighth aspects, the candidate search space configuration set is one of a plurality of candidate search space configuration sets that is pre-configured on the UE.

In a tenth aspect, alone or in combination with one or more of the first through ninth aspects, each of the plurality of candidate search space configuration sets is associated with a respective index.

In an eleventh aspect, alone or in combination with one or more of the first through tenth aspects, each of the plurality of candidate search space configuration sets is associated with a respective Layer 1 signal, item of control information, or message.

In a twelfth aspect, alone or in combination with one or more of the first through eleventh aspects, at least one search space identifier, associated with the candidate search space configuration set, is unique to the candidate search space configuration set.

In a thirteenth aspect, alone or in combination with one or more of the first through twelfth aspects, at least one search space identifier, associated with the candidate search space configuration set, is not unique to the candidate search space configuration set.

In a fourteenth aspect, alone or in combination with one or more of the first through thirteenth aspects, a search space parameter, associated with the at least one search space identifier, differs among the plurality of candidate search space configuration sets.

In a fifteenth aspect, alone or in combination with one or more of the first through fourteenth aspects, the search space parameter includes at least one of: a time duration; a period; a control resource set (CORESET) identifier; a beam; a number of physical downlink control channel (PDCCH) candidates per aggregation level; or a downlink control information (DCI) format.

In a sixteenth aspect, alone or in combination with one or more of the first through fifteenth aspects, a number of physical downlink control channel (PDCCH) candidates per search space is explicitly identified in the candidate search space configuration set.

In a seventeenth aspect, alone or in combination with one or more of the first through sixteenth aspects, a number of physical downlink control channel (PDCCH) candidates per search space is based at least in part on a number of search spaces associated with the candidate search space configuration set and a capability of the UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a network entity, comprising:
   determining, by the network entity, a result associated with an initial set of transmissions of a periodic transmission cycle;
   switching, by the network entity, a search space configuration set to be used for one or more slots of the periodic transmission cycle based at least in part on the result associated with the initial set of transmissions, wherein the search space configuration set is switched to a different search space configuration set, and wherein the initial set of transmissions include an initial transmission over a shared channel; and
   signaling, by the network entity, to a user equipment (UE), and via a radio resource control (RRC) connection, an indication associated with the network entity switching the search space configuration set.

2. The method of claim 1, wherein the result associated with the initial set of transmissions is a successful downlink transmission and a successful uplink transmission.

3. The method of claim 1, wherein the different search space configuration set comprises a search space configuration having a single search space with a single symbol.

4. The method of claim 1, wherein the result associated with the initial set of transmissions is a failure of at least one of a downlink transmission or an uplink transmission.

5. The method of claim 1, wherein the result is determined based at least in part on a negative acknowledgment (NACK) associated with a downlink transmission.

6. The method of claim 1, wherein the result is determined based at least in part on a discontinuous transmission (DTX) associated with an uplink transmission.

7. The method of claim 1, wherein the different search space configuration set comprises a search space configuration having a plurality of search spaces associated with a plurality of beams.

8. The method of claim 1, wherein the different search space configuration set is one of a plurality of candidate search space configuration sets that is pre-configured by the network entity.

9. The method of claim 8, wherein each of the plurality of candidate search space configuration sets is associated with a respective index or is associated with a respective Layer 1 signal, item of control information, or message.

10. The method of claim 8, wherein at least one search space identifier, associated with the different search space configuration set, is not unique to the different search space configuration set, and
    wherein a search space parameter, associated with the at least one search space identifier, differs among the plurality of candidate search space configuration sets.

11. The method of claim 10, wherein the search space parameter includes at least one of:
    a time duration;
    a period;
    a control resource set (CORESET) identifier;
    a beam;
    a number of physical downlink control channel (PDCCH) candidates per aggregation level; or
    a downlink control information (DCI) format.

12. The method of claim 1, wherein at least one search space identifier, associated with the different search space configuration set, is unique to the different search space configuration set.

13. The method of claim 1, wherein a number of physical downlink control channel (PDCCH) candidates per search space is explicitly identified in the different search space configuration set.

14. The method of claim 1, wherein a number of physical downlink control channel (PDCCH) candidates per search space is based at least in part on a number of search spaces associated with the different search space configuration set and a capability of a user equipment (UE).

15. The method of claim 1, wherein the different search space configuration set comprises a search space configuration having a search space with group index 0.

16. A method of wireless communication performed by a user equipment (UE), comprising:
    receiving, via a radio resource control (RRC) connection, an indication signaled by a network entity and associated with the network entity switching a search space configuration set, to be used for one or more slots of a periodic transmission cycle, based at least in part on a result associated with an initial set of transmissions of the periodic transmission cycle,
    wherein the result associated with the initial set of transmissions is based on one of:
        a failure of at least one of a downlink transmission over a shared channel or an uplink transmission,
        a negative acknowledgment (NACK) associated with the downlink transmission over the shared channel, or
        a discontinuous transmission (DTX) associated with the uplink transmission; and
    switching the search space configuration set based at least in part on the indication signaled by the network entity.

17. The method of claim 16, wherein the search space configuration set is switched to a different search space configuration set that comprises a search space configuration having a single search space with a single symbol.

18. The method of claim 16, wherein the result associated with the initial set of transmissions is based on the failure of the uplink transmission.

19. The method of claim 16, wherein the result associated with the initial set of transmissions is based at least in part on the NACK associated with the downlink transmission over the shared channel.

20. The method of claim 16, wherein the result associated with the initial set of transmissions is based at least in part on the DTX associated with the uplink transmission.

21. The method of claim 16, wherein the search space configuration set is switched to a different search space configuration set that comprises a search space configuration having a plurality of search spaces associated with a plurality of beams.

22. The method of claim 16, wherein the search space configuration set is switched to a different search space configuration set that is one of a plurality of candidate search space configuration sets that is pre-configured on the UE.

23. The method of claim 16,
wherein the search space configuration set is switched to a different search space configuration set, and
wherein a number of physical downlink control channel (PDCCH) candidates per search space is explicitly identified in the different search space configuration set.

24. The method of claim 16,
wherein the search space configuration set is switched to a different search space configuration set, and
wherein a number of physical downlink control channel (PDCCH) candidates per search space is based at least in part on a number of search spaces associated with the different search space configuration set and a capability of the UE.

25. The method of claim 16,
wherein the search space configuration set is switched to a different search space configuration set, and
wherein the different search space configuration set comprises a search space configuration having a search space with group index 0.

26. A network entity for wireless communication, comprising:
a memory; and
one or more processors, coupled to the memory, configured to cause the network entity to:
determine a result associated with an initial set of transmissions of a periodic transmission cycle;
switch a search space configuration set to be used for one or more slots of the periodic transmission cycle based at least in part on the result associated with the initial set of transmissions, wherein the search space configuration set is switched to a different search space configuration set, and wherein the initial set of transmissions include an initial transmission over a shared channel; and
signal, to a user equipment (UE) and via a radio resource control (RRC) connection, an indication associated with the network entity switching the search space configuration set.

27. The network entity of claim 26, wherein the different search space configuration set comprises a search space configuration having a search space with group index 0.

28. A user equipment (UE) for wireless communication, comprising:
a memory; and
one or more processors configured to:
receive, via a radio resource control (RRC) connection, an indication signaled by a network entity and associated with the network entity switching a search space configuration set, to be used for one or more slots of a periodic transmission cycle, based at least in part on a result associated with an initial set of transmissions of the periodic transmission cycle,
wherein the result associated with the initial set of transmissions is based on one of:
a failure of at least one of a downlink transmission over a shared channel or an uplink transmission,
a negative acknowledgment (NACK) associated with the downlink transmission over the shared channel, or
a discontinuous transmission (DTX) associated with the uplink transmission; and
switch the search space configuration set based at least in part on the indication signaled by the network entity.

29. The UE of claim 28,
wherein the search space configuration set is switched to a different search space configuration set, and
wherein the different search space configuration set comprises a search space configuration having a search space with group index 0.

30. A network entity for wireless communication, comprising:
a memory; and
one or more processors, coupled to the memory, configured to cause the network entity to:
switch search space configuration set to be used for one or more slots of a periodic transmission cycle based at least in part on a result associated with an initial set of transmissions, wherein the search space configuration set is switched to a different search space configuration set, and wherein the result associated with the initial set of transmissions is based on one of:
a failure of at least one of a downlink transmission over a shared channel or an uplink transmission,
a negative acknowledgment (NACK) associated with the downlink transmission over the shared channel, or
a discontinuous transmission (DTX) associated with the uplink transmission.

31. The network entity of claim 30, wherein the different search space configuration set comprises a search space configuration having a single search space with a single symbol.

32. The network entity of claim 30, wherein the different search space configuration set comprises a search space configuration having a plurality of search spaces associated with a plurality of beams.

* * * * *